United States Patent Office 2,920,064
Patented Jan. 5, 1960

2,920,064
PROCESS FOR HALOGENATION OF POLYMERS

James N. Baptist and Peter J. Canterino, Bartlesville, Okla., assignors to Phillips Petroleum Company, a corporation of Delaware No Drawing. Application July 29, 1954
Serial No. 446,666

20 Claims. (Cl. 260—88.2)

This invention relates to an improved process for halogenating a polymer. In one aspect it relates to a method for eliminating halogen losses occasioned by said reactions. In another aspect it relates to an improved process for halogenating a polymer in homogeneous solution.

It is known in the art to produce normally solid polymers of olefins by high-pressure polymerization. More recently, it has been found that normally solid polymers having advantageous properties can be produced at only moderately elevated temperatures and pressures by conducting the polymerization in the presence of a catalyst comprising chromium oxide. This process is disclosed in the copending application of J. P. Hogan and R. L. Banks, Serial No. 333,576, filed January 27, 1953, now abandoned. According to this process, an olefin, such as ethylene or propylene, is polymerized at a temperature in the range 150–450° F. The polymerization is advantageously conducted by subjecting to the polymerization conditions a solution of the olefin in a hydrocarbon solvent such as isooctane. The pressure need be only sufficient to maintain the solution substantially in the liquid phase and is ordinarily in the range 100–700 p.s.i. The catalyst comprises generally from 1 to 50 weight percent of chromium in the form of chromium oxide, advantageously including a substantial amount of hexavalent chromium, usually associated with at least one other oxide such as silica, alumina, or a mixture of alumina and silica, e.g., 90 weight percent silica and 10 weight percent alumina.

It is known to chlorinate commercial polyethylenes in solution in a solvent. Of the solvents used, carbon tetrachloride is frequently preferred since it is inert under the conditions of the reaction and is sufficiently low-boiling to be readily separated from the reaction product. Other solvents can, however, be employed, such as chloroform, symmetrical dichloroethane, 1,1,1-trichloroethane, ethylidene chloride, and the like. Many of the various types of commercial polyethylene can be dissolved in carbon tetrachloride or similar solvent either under reflux conditions or at lower temperatures and atmospheric pressure, and chlorination can be effected in solution to give rubbery products as well as resins, depending upon the chlorine content of the product. Polyethylenes prepared at relatively low pressures over a chromium oxide-silica, chromium oxide-alumina, or chromium oxide-silica-alumina catalyst, as more fully described in copending application, Serial No. 333,576, filed January 27, 1953, now abandoned, do not completely dissolve in carbon tetrachloride or similar relatively low-boiling solvent even under reflux conditions at atmospheric pressure. When a suspension of this material in carbon tetrachloride is chlorinated, the product is hard, brittle, and non-homogeneous in appearance. If it is desired to obtain colorless homogeneous products, particularly products which are soft and flexible and have rubbery properties, a special operating procedure must be provided. It is convenient to chlorinate the polyethylene in solution if a suitable solvent can be provided.

As stated above, it is known in the art to obtain resins and rubbery materials by chlorinating a solid polymer of an olefin. The chlorination is advantageously conducted with the polymer dissolved in a suitable solvent such as carbon tetrachloride. It has been found, however, that polymers produced by the process of Hogan and Banks are substantially insoluble in carbon tetrachloride at those temperatures at which carbon tetrachloride exists as a liquid at atmospheric pressure. It has been suggested in the art to conduct the chlorination of polymers such as polyethylene with the polymer suspended in a solvent. It has been found, however, that when the chlorination is conducted in this manner, the chlorinated product is non-uniform in character, has an undesirable color and is relatively unstable at elevated temperatures. When such a product is subjected to molding, decomposition occurs, and the molded product is heterogeneous in appearance. This difficulty is encountered when any substantial part of the polymer is insoluble in the solvent. The copending application of P. J. Canterino, Serial No. 442,891, filed July 12, 1954, discloses one method of overcoming this difficulty.

The present invention provides a method by which a normally solid olefin polymer which is substantially insoluble in carbon tetrachloride and similar low-boiling chlorinated solvents at temperatures at which such solvents exist as liquids at atmospheric pressure can be halogenated in homogeneous solution to obtain useful products which are uniform in character and relatively stable thermally. The product is colorless or nearly colorless.

According to this invention, the halogenation of a polymer of an olefin of the type described is conducted in two stages, the polymer being dissolved in a solvent selected from the group consisting of tetrachloroethane, chlorobenzene, and dichlorobenzene during the first stage, and the second stage being conducted with the partially halogenated polymer in solution in a low-boiling chlorinated solvent selected from the group consisting of carbon tetrachloride, chloroform, and methylene chloride. The halogenating reactant used is one capable of introducing a halogen selected from the group consisting of chlorine, bromine, and iodine into the polymer molecule. It is within the scope of the invention to utilize two or more of these halogens and obtain a halogenated polymer containing different halogens in the same molecule.

According to one modification of the invention, the chlorination of a normally solid polymer of an olefin, which polymer is substantially insoluble in carbon tetrachloride and similar low-boiling chlorinated solvents at atmospheric pressure and temperatures up to the normal boiling point of the solvent, is conducted in two stages; (1) chlorination of the polymer in solution in a solvent selected from the group consisting of tetrachloroethane (symmetrical or unsymmetrical), monochlorobenzene, and dichlorobenzene (the ortho, meta and/or para isomer) and mixtures of these solvents to obtain a partially chlorinated polymer which is soluble in a solvent selected from the group consisting of carbon tetrachloride, chloroform, methylene chloride, and mixtures of these solvents; (2) continuing the chlorination with the partially chlorinated polymer in solution in a solvent selected from the latter-mentioned group until a product containing the desired amount of combined chlorine is obtained.

The polymer used as a starting material according to this invention is ordinarily a normally solid polymer of ethylene produced in the presence of a chromium oxide catalyst as disclosed in the cited application of Hogan and Banks. The term "polymer of ethylene" as used herein is intended to include copolymers of ethylene with other olefins such as propylene. Normally solid polymers and copolymers of other olefins, generally, aliphatic 1-olefins having a maximum chain length of 8 carbon atoms and no chain branching nearer the double bond than the 4-position, can be used. Although the process is especially applicable to polymers of olefins, which polymers are insoluble in carbon tetrachloride and similar solvents, as stated above, the process can be used to halogenate any polymer of an olefin.

It will be evident to those skilled in the art that known halogenating agents other than elemental halogens can be used in the process of this invention. Elemental halogen is often preferred because the chief by-product of the halogenation is hydrogen halide, which is readily removable from the reaction mixture. Therefore elemental halogens such as chlorine, bromine, and iodine are often preferred. However, compounds which supply these halogens at the disclosed reaction conditions can be used, e.g. iodine chlorides.

According to one modification of the invention, solid polyethylene, prepared by polymerization of ethylene at relatively low pressures over a chromium oxide polymerization catalyst is chlorinated to give homogeneous products ranging from soft, rubbery materials to hard resins by dissolving the polyethylene in a solvent such as tetrachloroethane, chlorinating it until a product containing about 13 weight percent chemically combined chlorine is obtained, adding carbon tetrachloride or other similar relatively low-boiling chlorinated solvent to give a dilute solution of the polymer, and continuing the chlorination to yield a product having the desired chlorine content.

The polyethylene which is not soluble in carbon tetrachloride or similar low-boiling solvents (above-mentioned) dissolves in higher boiling solvents such as tetrachloroethane, chlorobenzene, or dichlorobenzene. In the chlorination of polyethylene, according to the prior art, dilute solutions of the polymer are ordinarily employed. While chlorination of dilute solutions of polyethylene in these higher boiling solvents can be effected and homogeneous products obtained, the removal of large quantities of such solvents from the product is difficult. In the early stages of chlorination the solvents are attacked little, if any, by the chlorine, but as the reaction proceeds and larger quantities of chlorine are introduced, there is a tendency for the solvent to undergo chlorination along with the polyethylene, thereby further increasing the difficulty of removing the solvent and impurities at the conclusion of the reaction. When halogenation is conducted with the olefin polymer in solution in tetrachloroethane to obtain a product containing more than about 13 to 20 weight percent of combined halogen, such product has an undesirable yellowish color, apparently imparted by products of halogenation of the solvent which are difficult or impossible to remove from the halogenated polymer. Also, halogenation of the solvent increases halogen consumption and therefore increases expense. Therefore, according to this invention, a relatively small amount of solvent is used in the initial halogenation step, as subsequently described.

When operating in accordance with the process of this invention, it is essential that the polyethylene (when it is the starting material) be dissolved in the solvent in order that a uniform product be obtained. For the first stage of the process, the preferred solvent is ordinarily 1,1,2,2-tetrachloroethane, because of its relative inertness, although other solvents such as chlorobenzene, and the dichlorobenzenes can be employed. The polyethylene is dissolved, generally with the aid of heat, and the halogenating agent, e.g., chlorine, is then introduced until a product containing at least 13 weight percent combined chlorine is obtained. The temperature at this stage of the chlorination is at least sufficient to cause all of the polymer to dissolve in the solvent and can suitably range from about the melting point of the polyethylene (e.g., at least about 113° C.) to the refluxing temperature of the solvent so long as no degradation of the polymer occurs. However, it is generally preferred to operate at a temperature which does not exceed about 130° C. The reaction mixture is agitated to provide rapid and uniform distribution of the chlorine. It is one object of this step of the process to provide a product which is soluble in solvents such as carbon tetrachloride, chloroform, methylene chloride, and the like. In order to accomplish this result, chlorination is continued until material contains at least 13, and generally not more than 20, weight percent chlorine. Polyethylene chlorinates more readily at first than during the later stages of the reaction. In this first reaction step, very little, if any, chlorination of the solvent occurs.

After the first chlorination step, the mixture is cooled and a lower-boiling solvent such as carbon tetrachloride or similar material is added, and chlorination is continued until a product having the desired chlorine content is provided. The mixture is also agitated during this step of the process. Reaction temperatures ranging from 25° C. to the reflux temperature of the solvent can be employed. The temperature must be maintained at a high enough level to keep the polymer in solution. The preferred solvent for this step of the process is carbon tetrachloride since it is inert under the conditions of the reaction and does not undergo chlorination. The presence of the volatile, second-stage solvent facilitates removal of the higher-boiling, first-stage solvent from the final product.

In an alternative procedure according to this invention, the first halogenation step is carried out as hereinbefore described and the partially halogenated polymeric material is then separated from at least a major portion of the solvent by any suitable means. The partially halogenated polymer can be coagulated by the addition of an alcohol such as isopropyl alcohol, or the mixture can be treated with water at a temperature near its boiling point, or with steam, to volatilize the solvent. The partially halogenated polymer is then dried, dissolved in carbon tetrachloride or other suitable solvent, and further halogenated. The first-stage solvent can be removed, wholly or partially, from the partially chlorinated product by distillation or flashing, prior to introduction of the second-stage solvent.

It is generally preferred that halogenation be effected in the presence of a catalyst. The reaction zone can be irradiated with sunlight or artificial light. Ultraviolet light is frequently employed. Catalysts include peroxides and hydroperoxides, e.g., benzoyl peroxide, diisopropylbenzene hydroperoxide and cumene hydroperoxide, and azo compounds, particularly those having cyano groups on the carbon atoms alpha to the azo nitrogen atoms, such as dimethyl and diethyl alpha, alpha'-azodiisobutyrate, alpha, alpha'-azodiisobutyronitrile, and alpha, alpha'-azobis(alpha,gamma-dimethylvaleronitrile).

Sufficient solvent is employed to provide a solution of low enough viscosity that it can be easily stirred. By using a solution of fairly low viscosity, the halogenating agent can be readily contacted with the polymer and can be uniformly distributed throughout the mixture in a minimum of time, thus promoting the formation of a more uniformly halogenated product. More efficient temperature control is attained in solutions of relatively low viscosity than in more viscous solutions in which there is a tendency for certain areas to become overheated. The maximum viscosity in any particular case will depend on the conditions of contacting, the type of agitation used, and other factors known to those skilled in the art. The proper viscosity in any particular instance can readily be determined by one skilled in the art in view of the foregoing discussion. Substantially colorless or only slightly colored products can be readily obtained through proper temperature and viscosity control.

For the first step of the process, the amount of solvent should be kept as low as practicable in order to facilitate subsequent removal of the solvent. The ratio of solvent to polymer, in parts by weight, is generally in the range from 1:1 to 5:1, preferably not more than 4:1, i.e., the concentration of polymer in the solvent is usually in the range from about 16 to 50 percent by weight.

It is preferred that the final halogenation step be effected in a solution containing from 3 to 20, preferably from 3 to 10, weight percent polymer, based on partially halogenated polymer plus second-stage solvent, any first-stage solvent present being neglected for the purpose of this calculation. The amount of solvent is regulated to give a solution of low enough viscosity that, when chlorine, for example, is added, it can be incorporated readily and uniformly throughout the reaction mixture. By operating in this manner, a homogeneous product having the desired properties is obtained.

Both steps of the halogenation process are ordinarily conducted at atmospheric pressure. However, higher pressures, e.g., up to 500 p.s.i., can be used if desired.

A larger quantity of solvent is generally employed in the second step of the process than in the first step. Any tetrachloroethane or similar solvent present in the reaction mixture from the first step is diluted by the low-boiling solvent in the second step, thus minimizing the tendency for the higher-boiling solvent to be chlorinated and facilitating ultimate removal of the higher-boiling solvent, especially where solvent removal by flashing is practiced.

Final recovery of the ultimate halogenated polymer can be effected by dilution of the reaction mixture with an alcohol, such as isopropyl alcohol, by fractional distillation, by flashing the solvents, e.g. in a vacuum, by low-temperature crystallization, by steam distillation, or by any combination of these or equivalent methods known in the art.

The process of this invention is valuable for the production of chlorinated polyethylene containing 13 weight percent or more of chlorine. Products can be obtained containing 70 percent or more (e.g. 75%) combined chlorine.

Products having a wide variety of properties can be provided depending upon the extent of halogenation. Materials suitable for the manufacture of adhesives, surface coatings, sheets and films, and various types of molded articles are obtained.

*Example I*

Ethylene was polymerized over a chromium oxide-silica-alumina catalyst containing 2.5 weight percent chromium as chromium oxide supported on a coprecipitated carrier comprising 10 percent $Al_2O_3$ and 90 percent $SiO_2$ by operating at 320° F., a pressure of 400 p.s.i.g., a space velocity (volume liquid/volume catalyst/hour) of 5, and a feed containing 2.9 weight percent ethylene in isooctane (2,2,4-trimethylpentane). The ethylene feed rate was 2.3 pounds per hour. The polyethylene obtained was insoluble in benzene and acetone, had a density of 0.960 at 20° C., a melting point of 245±2° F., an inherent viscosity of 0.558, a tensile strength of 850 p.s.i., an elongation of 5 percent, and a molecular weight of about 13,640. This polyethylene was employed in a series of chlorination reactions.

A reactor provided with a stirrer, an irradiation window, and a Dry Ice condenser was charged with 300 grams of the polyethylene described above, 480 grams of technical grade 1,1,2,2-tetrachloroethane was added, the mixture was warmed to 140° C., to dissolve the polyethylene, and, during stirring, 100 grams of chlorine was introduced over a period of approximately 6 hours. The reaction was effected in the presence of ultraviolet light. The viscous reaction mixture was poured into 2400 grams of carbon tetrachloride and warmed to 80° C. An additional 200 grams of chlorine was introduced over a period of approximately 6 hours in the presence of ultraviolet light. The product remained in solution. At this point the solution was divided into two equal parts, designated 1 and 2. To the portion designated 2, 300 more grams of chlorine was added over a period of 7 to 8 hours, again in the presence of ultraviolet light. Both 1 and 2 were worked up separately by pouring them into isopropyl alcohol, washing with isopropyl alcohol, and drying in a vacuum oven, first for 16 hours at 50° C. and then for four hours at 70° C. Both products were soluble in carbon tetrachloride at 25° C., but 1 dissolved more readily than 2.

Another sample of the polyethylene (200 grams) prepared as described above, and in the form of a fine powder, was added to 1800 grams of carbon tetrachloride. The polyethylene did not dissolve at reflux temperature but formed a slurry. The slurry was heated to reflux temperature, and 225 grams of chlorine was introduced, with stirring, over a 6.5-hour period. The reaction was effected in the presence of ultraviolet light as before. The polymer did not go into solution after treatment with chlorine. The mixture was poured into isopropyl alcohol to coagulate the product which was dried in a vacuum oven at 50° C. for 12 hours. This run was designated as 3.

Another sample of the polyethylene (100 grams), also in the form of a fine powder, was added to 960 grams of carbon tetrachloride and the mixture heated to reflux temperature. Three hundred grams of chlorine was gradually introduced in the presence of ultraviolet light. The mixture was stirred throughout the reaction. At no time was the polymer completely in solution. The reaction mixture was poured into isopropyl alcohol to coagulate the product which was separated and dried for 12 hours in a vacuum oven at 50° C. This run was designated as 4.

One-hundred-fifty grams of the polyethylene was added to a mixture of 240 grams of 1,1,2,2-tetrachloroethane and 1200 grams of carbon tetrachloride, the resulting slurry was heated to reflux temperature, and 168 grams of chlorine was introduced as before. The product was not completely dissolved after addition of the chlorine. It was coagulated with isopropyl alcohol and dried as in the preceding run. This run was designated as 5.

The following table contains a summary of the several runs together with physical properties.

|  | Run | | | | |
| --- | --- | --- | --- | --- | --- |
|  | 1 | 2 | 3 | 4 | 5 |
| Weight ratio polyethylene:chlorine | 1:1 | 1:3 | 1:1.1 | 1:3 | 1:1.1 |
| Weight ratio polyethylene:total solvent | 1:9.6 | 1:9.6 | 1:9 | 1:9.6 | 1:9.6 |
| Combined Chlorine in product, weight percent | 29.4 | 63.6 | 37.7 | 57.9 | 35.5 |
| Appearance at end of reaction | soluble | soluble | not completely soluble | | |
| Tensile strength, p.s.i. | 1>203 | 1980 | 1210 | 1500 | 860 |
| Elongation at break, percent | 1>1,340 | 5 | 5 | 5 | 4 |
| Softening point, °F | 95 | 160 | 236 | 256 | 230 |
| Flex temperature, °F | −45 | | too brittle to measure | | |

1 The material was very soft and stretched to the capacity of the machine without breaking.

The foregoing data show that the products obtained according to the process of this invention are superior in elongation or tensile strength to products prepared according to prior art methods. Furthermore, the products prepared according to this invention are uniform in color and appearance, whereas those produced according to the prior art methods disclosed by runs 3, 4, and 5 are non-uniform and relatively unstable thermally.

*Example II*

Polyethylene was prepared in a manner similar to that described in Example I to give a product having a molecular weight of 10,000–11,000. A reactor provided with a stirrer and a Dry Ice condenser was charged with 800 grams of this polyethylene and 2 liters (3200 grams) of tetrachloroethane, the mixture was heated to a temperature in the range 120 to 130° C. to dissolve the polyethylene, and, during stirring, 275 grams of chlorine was introduced over a period of approximately 3 hours. The reaction was effected in the presence of ultraviolet light. The product obtained contained about 15 weight percent of combined chlorine. The solution of the reaction produced was poured into isopropyl alcohol to coagulate the polymer which was then dried in a vacuum oven at 50° C. for 11 hours and at 70° C. for 4 hours.

Two runs were made to continue the chlorination of the product described above. In the first run, 400 grams of the partially chlorinated polyethylene containing approximately 15 percent combined chlorine was added to 4800 grams of carbon tetrachloride and the mixture was heated to 60° to dissolve the polymer. Chlorine (700 grams) was then introduced over a period of 8 hours while the mixture was stirred and the temperature was held at 60° C. The reaction was effected in the presence of ultraviolet light. The product was separated by coagulation with isopropyl alcohol, and was dried in a vacuum oven at 50° C. for 18 hours and at 70° C. for 6 hours. It had a chlorine content of 52.8 weight percent. The product is a rubbery material which can be extruded to form tubing.

In the second run, the same procedure was followed using 400 grams of the partially chlorinated polyethylene, containing approximately 15 percent chlorine dissolved in 4800 grams of carbon tetrachloride. In this run, 940 grams of chlorine was introduced, with stirring, over a period of 12 to 14 hours while the mixture was irradiated with ultraviolet light and the temperature was maintained at 60° C. The product was coagulated and dried as before and had a chlorine content of 58 percent. It can be extruded to form electrical insulation.

Similar products are obtained by using, as solvents, monochlorobenzene in the first chlorination step and chloroform in the second step, o-dichlorobenzene in the first and chloroform in the second, m-dichlorobenzene in the first and methylene chloride in the second, or p-dichlorobenzene in the first and carbon tetrachloride in the second.

Although certain process steps, structures, examples, and compositions have been disclosed for purposes of illustration, it is clear that the invention is not limited thereto and that variation and modification are possible within the scope of the disclosure and claims to the invention, the essence of which is a process which comprises halogenating an olefin polymer in solution in a solvent selected from the group tetrachloroethane, chlorobenzene and dichlorobenzene in a first stage and in solution in a solvent selected from the group consisting of carbon tetrachloride, chloroform, and methylene chloride in a second stage. Although the invention has been described chiefly with reference to chlorination, bromination and iodination are also within the scope of the invention. The invention can be practiced in a batchwise or continuous manner.

The molecular weights mentioned herein are based on the methods of Kemp and Peters, Ind. Eng. Chem., 35, 1108 (1943), and Dienes and Klemm, J. App. Phys., 17, 458–471 (June 1946).

The molecular weights were calculated according to the equation $$M = \frac{4.03 \times 10^3 \times N_i \times 14}{2.303}$$

wherein M is the molecular weight and $N_i$ is the instrinsic viscosity as determined for a solution of 0.2 gm. of polymer in 50 cc. of tetralin at 130° C.

The molecular weight of the polymeric starting materials of this invention range from 1000 to 200,000 or higher.

We claim:

1. A process which comprises chlorinating a normally solid polymer of an aliphatic 1-olefin having a maximum monomer chain length of 8 carbon atoms and no branching nearer the double bond than the 4-position in solution in a solvent selected from the group consisting of 1,1,2,2-tetrachloroethane, chlorobenzene, dichlorobenzenes and mixtures of these solvents, at a temperature in the range from a temperature sufficiently high to dissolve said polymer to the solvent reflux temperature to obtain a partially chlorinated polymer containing up to about 20 weight percent combined chlorine which partially chlorinated polymer is soluble at atmospheric pressure in a solvent selected from the group consisting of carbon tetrachloride, chloroform, methylene chloride, and mixtures of these solvents, without effecting substantial halogenation of the solvent of said first-mentioned group, dissolving said partially chlorinated polymer in a solvent selected from the latter-mentioned group and continuing the chlorination in the resulting solution to obtain a more highly chlorinated polymer, the original unchlorinated polymer being substantially insoluble in carbon tetrachloride at those temperatures at which carbon tetrachloride exists as a liquid at atmospheric pressure.

2. A process for the chlorination of a normally solid polymer of ethylene, which process comprises chlorinating said polymer in solution in a solvent selected from the group consisting of 1,1,2,2-tetrachloroethane, chlorobenzene, dichlorobenzenes, and mixtures of these compounds, at a temperature in the range from a temperature sufficiently high to maintain said polymer in solution in said solvent to the solvent reflux temperature to obtain a partially chlorinated polymer which is soluble at atmospheric pressure in a solvent selected from the group consisting of carbon tetrachloride, chloroform and methylene chloride and which contains from 13 to 20 weight percent chemically combined chlorine, dissolving said partially chlorinated polymer in a solvent selected from the group consisting of carbon tetrachloride, chloroform, methylene chloride, and mixtures of these compounds, maintaining the partially chlorinated polymer in solution in the last-mentioned solvent at a temperature in the range from 25° C. to the reflux temperature while continuing the chlorination to obtain a chlorinated polymer containing up to 70 weight percent chemically combined chlorine, and having a higher chemically combined chlorine content than said partially chlorinated polymer and recovering said chlorinated polymer, the original unchlorinated polymer being substantially insoluble in carbon tetrachloride at those temperatures at which carbon tetrachloride exists as a liquid at atmospheric pressure.

3. A process for chlorinating a solid polymer of ethylene, which polymer has been produced by the polymerization of ethylene in the presence of a chromium oxide-containing catalyst, said polymer being insoluble in carbon tetrachloride at those temperatures at which carbon tetrachloride is a liquid at atmospheric pressure, which process comprises dissolving said polymer in 1,1,2,2-tetrachloroethane, maintaining the temperature of the resulting solution in the range from the melting point of said polymer to the reflux temperature of said solution, passing elemental chlorine through said solution until a partially chlorinated polymer containing from 13 to 20 weight percent chemically combined chlorine is obtained, dissolving said partially chlorinated polymer in carbon tetrachloride, further chlorinating said partially chlorinated polymer by passing elemental chlorine through the resulting solution, maintaining said solution at a temperature in the range 25° C. to the reflux temperature of said solution, and recovering a chlorinated polymer containing up to 70 weight percent chemically combined chlorine and having a higher chemically combined chlorine content than said partially chlorinated polymer.

4. A process according to claim 3 wherein the temperature of chlorination of the solution in tetrachloroethane is from the melting point of said polymer to 130° C., the ratio of tetrachloroethane to polyethylene is in the range 1:1 to 5:1, and the concentration of the partially chlorinated polymer in carbon tetrachloride is from 3 to 20 weight percent.

5. A process according to claim 3 wherein at least part of said tetrachloroethane is separated from said partially chlorinated polymer prior to the dissolution of said partially chlorinated polymer in carbon tetrachloride.

6. A process according to claim 3 wherein the ratio of tetrachloroethane to said polymer is in the range 1:1 to 4:1, and the concentration of said partially chlorinated polymer in carbon tetrachloride is in the range 3 to 10 weight percent.

7. A process according to claim 3 wherein the concentration of said polymer of ethylene in the tetrachloroethane is in the range 16 to 50 weight percent.

8. A process, for the halogenation of a normally solid polymer of an aliphatic 1-monoolefin having a maximum chain length of 8 carbon atoms and no branching nearer the double bond than the 4-position, which polymer is substantially insoluble in carbon tetrachloride at those temperatures at which carbon tetrachloride is liquid at atmospheric pressure, which process comprises initially effecting partial halogenation by introduction, into the polymer molecules, of atoms of halogen selected from the group consisting of chlorine, bromine, and iodine while said polymer is in solution in a solvent selected from the group consisting of tetrachloroethane, chlorobenzene, and dichlorobenzenes, at a temperature in the range from a temperature sufficiently high to maintain said polymer in solution to the reflux temperature, continuing the halogenation to obtain a partially halogenated polymer which is soluble at atmospheric pressure, and temperatures up to and including the solvent boiling point, in a solvent selected from the group hereinafter defined, but without substantial halogenation of the solvent selected from said first-mentioned group, and completing the halogenation while the partially halogenated polymer is in solution in a solvent selected from the group consisting of carbon tetrachloride, chloroform, and methylene chloride.

9. A process according to claim 8 wherein said polymer is a copolymer of ethylene and propylene.

10. A process according to claim 8 wherein the solvent selected from the first-mentioned group is monochlorobenzene and the solvent selected from the latter mentioned group is chloroform.

11. A process according to claim 8 wherein the solvent selected from the first-mentioned group is o-dichlorobenzene and the solvent selected from the latter-mentioned group is chloroform.

12. A process according to claim 8 wherein the solvent selected from the first-mentioned group is m-dichlorobenzene and the solvent selected from the latter-mentioned group is methylene chloride.

13. A process according to claim 8 wherein the solvent selected from the first-mentioned group is p-dichlorobenzene and the solvent selected from the latter-mentioned group is carbon tetrachloride.

14. A process according to claim 8 wherein the halogen is elemental chlorine.

15. A process according to claim 8 wherein the halogen is elemental bromine.

16. A process according to claim 8 wherein the halogen is elemental iodine.

17. A process, for chlorinating an ethylene polymer which is substantially insoluble in carbon tetrachloride at those temperatures at which carbon tetrachloride is a liquid at atmospheric pressure, which process comprises dissolving said polymer in from 1 to 5 parts by weight of 1,1,2,2-tetrachloroethane per part by weight of said polymer, reacting said polymer, in the resulting solution, with elemental chlorine at a temperature in the range from the melting point of said polymer to the reflux temperature of said solution to obtain a partially chlorinated polymer which is soluble in carbon tetrachloride at atmospheric pressure and which contains from 13 to 20 weight percent combined chlorine, adding carbon tetrachloride to the mixture to form a solution containing from 3 to 20 weight percent (based on partially chlorinated polymer plus carbon tetrachloride) of said partially chlorinated polymer, reacting said partially chlorinated polymer, in the resulting solution, with elemental chlorine at a temperature in the range from 25° C. to the reflux temperature of the solution, and recovering a chlorinated polymer having a chemically combined chlorine content in the range up to 70 weight percent and greater than that of said partially chlorinated polymer.

18. A process, for chlorinating an ethylene polymer which is substantially insoluble in carbon tetrachloride at those temperatures at which carbon tetrachloride is liquid at atmospheric pressure, which process comprises dissolving said polymer in from 1 to 5 parts by weight of 1,1,2,2-tetrachloroethane per part by weight of said polymer, reacting said polymer, in the resulting solution, with elemental chlorine at a temperature in the range from the melting point of said polymer to the reflux temperature of said solution to obtain a partially chlorinated polymer which is soluble in carbon tetrachloride at atmospheric pressure and which contains from 13 to 20 weight percent chemically combined chlorine, separating at least part of said tetrachloroethane from said partially chlorinated polymer, dissolving said partially chlorinated polymer in sufficient carbon tetrachloride to form a solution in which the concentration of partially chlorinated polymer is in the range 3 to 20 weight percent (based on partially chlorinated polymer plus carbon tetrachloride), reacting said partially chlorinated polymer, in the resulting solution with elemental chlorine at a temperature in the range from 25° C. to the reflux temperature of the carbon tetrachloride solution, and recovering a chlorinated polymer having a chemically combined chlorine content in the range up to 70 weight percent and greater than that of said partially chlorinated polymer.

19. A process which comprises chlorinating a normally solid polymer of an olefin in solution in 1,1,2,2-tetrachloroethane to obtain a partially chlorinated polymer which is soluble at atmospheric pressure in carbon tetrachloride, but without effecting any substantial chlorination of said tetrachloroethane, dissolving said partially chlorinated polymer in carbon tetrachloride and continuing the chlorination in the resulting solution in carbon tetrachloride to obtain a more highly chlorinated polymer, the original unchlorinated polymer being substantially insoluble in carbon tetrachloride at those temperatures at which carbon tetrachloride exists as a liquid at atmospheric pressure.

20. A process for the chlorination of a normally solid polymer of ethylene, which process comprises chlorinating said polymer in solution in 1,1,2,2-tetrachloroethane to obtain a partially chlorinated polymer containing from approximately 13 to approximately 20 weight percent chemically combined chlorine, but without effecting any substantial chlorination of said tetrachloroethane, dissolving said partially chlorinated polymer in carbon tetrachloride, continuing the chlorination to obtain a chlorinated polymer containing up to 70 weight percent combined chlorine, and recovering said chlorinated polymer, the original unchlorinated polymer being substantially insoluble in carbon tetrachlorde at those temperatures at which carbon tetrachloride exists as a liquid at atmospheric pressure.

References Cited in the file of this patent

UNITED STATES PATENTS

| | | |
|---|---|---|
| 2,503,252 | Ernsberger | Apr. 11, 1950 |
| 2,581,927 | Briant | Jan. 8, 1952 |
| 2,748,105 | Becker et al. | May 29, 1956 |